(12) United States Patent
Ishiyama et al.

(10) Patent No.: US 8,079,393 B2
(45) Date of Patent: Dec. 20, 2011

(54) PNEUMATIC TIRE WITH NARROW BELT REINFORCING LAYER IMMEDIATELY BELOW WITH TERMINAL END OF FOLDED BELT LAYER

(75) Inventors: Makoto Ishiyama, Kodaira (JP); Jun Matsuzaki, Kodaira (JP); Masafumi Koide, Hidaka (JP)

(73) Assignee: Bridgestone Corporation, Tokyo (JP)

( * ) Notice: Subject to any disclaimer, the term of this patent is extended or adjusted under 35 U.S.C. 154(b) by 1093 days.

(21) Appl. No.: 11/794,205

(22) PCT Filed: Dec. 7, 2005

(86) PCT No.: PCT/JP2005/022460
§ 371 (c)(1),
(2), (4) Date: Oct. 2, 2007

(87) PCT Pub. No.: WO2006/070570
PCT Pub. Date: Jul. 6, 2006

(65) Prior Publication Data
US 2008/0047649 A1   Feb. 28, 2008

(30) Foreign Application Priority Data

Dec. 27, 2004  (JP) ................................. 2004-376161
Dec. 28, 2004  (JP) ................................. 2004-379627

(51) Int. Cl.
*B60C 9/26* (2006.01)
*B60C 9/18* (2006.01)

(52) U.S. Cl. .......................... 152/529; 152/528; 152/534

(58) Field of Classification Search .................. 152/528, 152/529, 534
See application file for complete search history.

(56) References Cited

U.S. PATENT DOCUMENTS 3,985,173 A * 10/1976 Masson .......................... 152/529
5,088,538 A    2/1992 Navaux

FOREIGN PATENT DOCUMENTS

| FR | 1.416.538 | * | 9/1965 |
| GB | 1 364 426 | * | 8/1974 |
| GB | 1 590 013 | * | 5/1981 |
| JP | 63-125406 A |   | 5/1988 |
| JP | 03169715 A | * | 7/1991 |
| JP | 89406/1992 |   | 8/1992 |
| WO | WO-98/23456 A1 | * | 6/1998 |

OTHER PUBLICATIONS

"Tire Cord", Kirk-Othmer Encyclopedia of Chemical Technology, 4th ed., vol. 24, John Wiley & Sons, Inc., 1997, p. 169.*

* cited by examiner

*Primary Examiner* — Adrienne C Johnstone
(74) *Attorney, Agent, or Firm* — Sughrue Mion, PLLC

(57) ABSTRACT

A pneumatic tire 1 having a toroidal carcass 3 and a belt 7 consisting of belt layers 5, 6 arranged in the outer circumferential side of a crown portion 4 of the carcass 3. Between the adjacent belt layers 5, 6, the cords 8, 9 are crossed with each other with respect to an equatorial plane E of the tire to form cross belt layers. The widest belt layer 6 is a folded belt layer having a body portion 10 and a folded portion 12. A cord 9 constituting the folded belt layer 6 is an organic fiber cord. A narrow belt reinforcing layer 14 of rubberized cords 13 is arranged at least immediately below the width terminal end 11 of the body portion 10 of the folded belt layer 6 which terminal end 11 abuts on the folded portion 12.

7 Claims, 14 Drawing Sheets

PNEUMATIC TIRE WITH NARROW BELT REINFORCING LAYER IMMEDIATELY BELOW WITH TERMINAL END OF FOLDED BELT LAYER

FIELD OF THE INVENTION

The present invention relates to a pneumatic tire having a carcass consisting of at least one toroidal carcass ply and a belt consisting of at least two belt layers containing rubberized cords and arranged in the outer circumferential side of a crown portion of the carcass, the cords of adjacent belt layers being crossed with each other with respect to an equatorial plane of the tire to form cross belt layers. More particularly, the present invention is directed to prevent a separation developed from the end portion of the belt to improve durability of such a tire.

RELATED ART

A pneumatic tire commonly has a basic structure in which a carcass typically consisting of one or two plies and a belt consisting of at least two belt layers arranged in the outer circumferential side of a crown portion of the carcass are provided and the cords of adjacent belt layers being crossed with each other with respect to an equatorial plane of the tire to form cross belt layers, and the tire optionally has a reinforcing layer which contains rubberized organic fiber cords with an angle with respect to an equatorial plane of the tire being 10 degrees or less and which is spirally winded to cover the belt layers. Further, for a heavy-duty tire used for a truck, bus, aircraft or the like, a structural member of the tire is reinforced by increasing the number of plies constituting the carcass, increasing the number of layers constituting the belt layers or using steel cords as the cords constituting the reinforcing layer.

In the pneumatic tire having the cross belt layers, the belt has the largest strain at the neighbor of the maximum width position of the belt and a crack is prone to grow from the maximum width position, i.e. both widthwise end portion of the belt. The reason of this is considered to be as follows. A tension is applied to each belt layer of the cross belt layers due to an internal pressure of the tire and, when further load is applied, the belt is deformed flatly along the road surface and the adjacent belt layers tend to mutually slide in the plane of the belt. Especially at the end portion of the cross belt layer, the end portions of the crossing cords tend to move oppositely with each other in the circumferential direction of the tire, so that the rubber between the adjacent belt layers is sheared to cause a crack. Since the tire is rotated, a slide causes between the adjacent belt layers and the rubber sandwiched between these layers is subjected to a shear force when the tire contacts the road surface, and, on the other hand, the belt layers restore to the original shape when the tire leaves the road surface. Repeat of such slide and restore is one of primal causes of growing the crack. Further, the belt layer is formed in such a manner that an adhesive agent is applied to many cords arranged in parallel with each other; the cords are subsequently rubber coated to obtain a fabric-like band member; and the band member is cut to have a given extending angle of cords and a given width. This makes cut faces of the cords bared at the cut edges of the band member, i.e. both width end portions of the belt layer, and no adhesive agent is applied on these cut faces, so that the end portions have poor adhesiveness to the coating rubber and are therefore in a state where a crack easily occurs. In this way, the cut faces where a crack prone to occur are located at the both end portions of the belt where strain becomes maximum, and this is another major cause of occurring a crack at the both end portions of the belt.

In order to prevent such a crack which tends to occur at the both belt portion, for example, Japanese Patent Application Laid-open Nos. H8-282209 (JP 8282209 A), H8-318705 (JP 8318705 A) and H11-321222 (JP 11321222 A) disclose a pneumatic tire in which the widest belt layer is folded back at its both end portions toward inside in the width direction of the tire to form a folded belt layer. In this tire, the both end portions of the belt have a folding structure and thus a binding force between the belt layers is enhanced to suppress the slide at the both end portions in the circumferential direction of the tire. As a result, it is possible to prevent a crack occurring due to the shear of the rubber between the belt layers. In addition, there is no cut face of the cord at the both end portions of the belt where the strain is maximized, so that the crack caused by the cut face can be also prevented.

DISCLOSURE OF THE INVENTION

However, even when the folded belt layer is adapted to a tire, a crack occasionally occurs from the both end portions of the tire to lead to a malfunction. The reason is considered as follows. Firstly, the belt layer has to be folded back at generally 180 degrees to form a folded belt layer, so that organic fiber cords are often used for the folded belt layer in the light of workability. In addition, although the occurrence of the slide is suppressed at the both end portions of the folded belt layer as compared with the both end portions of the ordinal belt layer, as mentioned in the above, tiny forces of tension and compression alternately act on the cords at the both end portions in accordance with the rotation of the tire. Since organic fiber has a tendency to ravel out when it is compressed to even a small extent, the lay of the organic fiber constituting the cord may be raveled with the repeated compress force. As a result, the organic fiber may be easily peeled off from the coating rubber or an air gap is produced inside the raveled cord, which may be a nucleus of the occurrence of a crack. Especially in the case of a heavy-duty tire, the belt is deformed to a large extent and the cords tend to be compressed, so that a crack readily occurs.

Accordingly, the object of the present invention is to provide a pneumatic tire in which the durability is improved, even when organic fiber cords are used for a folded belt layer, by dispersing or reducing the compress force applied to the organic fiber cord at the both end portions of the folded belt layer.

In order to achieve the above-mentioned object, the present invention provides a pneumatic tire having a carcass consisting of at least one toroidal carcass ply and a belt consisting of at least two belt layers containing rubberized cords and arranged in the outer circumferential side of a crown portion of the carcass, the cords of adjacent belt layers being crossed with each other with respect to an equatorial plane of the tire to form cross belt layers, wherein the widest belt layer among the belt layers constituting the belt is a folded belt layer having a body portion which forms the cross belt layers with another adjacent belt layer and a folded portion which extends from at least one width terminal end of the body portion and is formed by folding back on the outer circumferential side of the body portion, and wherein a cord constituting the folded belt layer is an organic fiber cord, and wherein one narrow belt reinforcing layer of rubberized cords is arranged at least immediately below the width terminal end of the body portion of the folded belt layer which terminal end abuts on the folded portion, and wherein the belt reinforcing layer is arranged over a region at least between 10 mm and 100 mm inwardly in the width direction of the tire from the position immediately below the width terminal end of the body portion of the folded belt layer. According to this embodiment, the arrangement of the belt reinforcing layer prevent the organic fiber from raveling out, which results in an improvement of the durability.

The term arranging the belt reinforcing layer "at least immediately below the width end section of the body portion of the folded belt layer which terminal end abuts on the folded portion" as used herein means a state where the belt reinforcing layer exists at the position inside along the radial direction of the tire from the end section of the body portion of the folded belt layer in the width direction of the tire which end section abuts on the folded portion, and the belt reinforcing layer extends inwardly and/or outwardly in the width direction of the tire from this position.

The "narrow belt reinforcing layer" as used herein means that the belt reinforcing layer has a width which is less than a half of the width of the belt.

Preferably, the cord constituting the belt reinforcing layer inclines in the same direction of the cord of the body portion of the folded belt layer with respect to the equatorial plane of the tire, and the angle formed between the cord constituting the belt reinforcing layer and the equatorial plane of the tire is within a range from 10 to 60 degrees. In this case, it is further preferred that the angle formed between the cord constituting the belt reinforcing layer and the equatorial plane of the tire is generally the same as the angle formed between the cord constituting the body portion of the folded belt layer and the equatorial plane of the tire. It is noted that the term "generally the same as the angle formed between the cord constituting the body portion of the folded belt layer and the equatorial plane of the tire" as used herein means the angle within a range +/−20 degrees, preferably +/−10 degrees from the angle formed between the cord constituting the body portion of the folded belt layer. According to this embodiment, a compressive force applied on the width terminal end of the belt can be supported by the cords constituting the belt reinforcing layer and the body portion of the folded belt layer in a dispersed manner and thus the compressive force applied to each of the cords can be reduced. As a result, the organic fiber is prevented from being raveled to improve the durability.

Alternatively, the cord constituting the belt reinforcing layer preferably inclines in the direction opposed to the cord constituting the body portion of the folded belt layer with respect to the equatorial plane of the tire and the angle formed between the cord constituting the belt reinforcing layer and the equatorial plane of the tire is preferably within a range from 20 to 70 degrees. According to this embodiment, the belt reinforcing layer restricts a movement of the width terminal end of the body portion of the folded belt layer in the circumferential direction of the tire, so that the compressive force applied to the cord can be reduced. As a result, the organic fiber is prevented from being raveled to improve the durability.

The belt reinforcing layer is preferably folded back on the outer circumferential side of the body portion of the folded belt layer along with the folded belt layer.

The other belt layers are preferably arranged at least on the outer circumferential side of the folded belt layer and the folded belt layer envelops the width terminal ends of the other belt layers with its body and folded portions.

The cord constituting the belt reinforcing layer is preferably any one of an organic fiber cord, glass fiber cord and steel cord depending on the mass, rigidity and the like required for the belt reinforcing layer.

REFERENCE SYMBOLS

| | |
|---|---|
| 1 | tire |
| 2 | bead core |
| 3 | carcass |
| 4 | crown portion of the carcass |
| 5, 6 | belt layer |
| 7 | belt |
| 8, 9 | cord constituting the belt layer |
| 10 | body portion of the folded belt layer |
| 11 | width terminal end of the body portion of the folded belt layer |
| 12 | folded portion of the folded belt layer |
| 13 | cord constituting the belt reinforcing layer |
| 14 | belt reinforcing layer |
| 15 | width terminal end of the other belt layer |

BEST MODE FOR CARRYING OUT THE INVENTION

Figure 1:
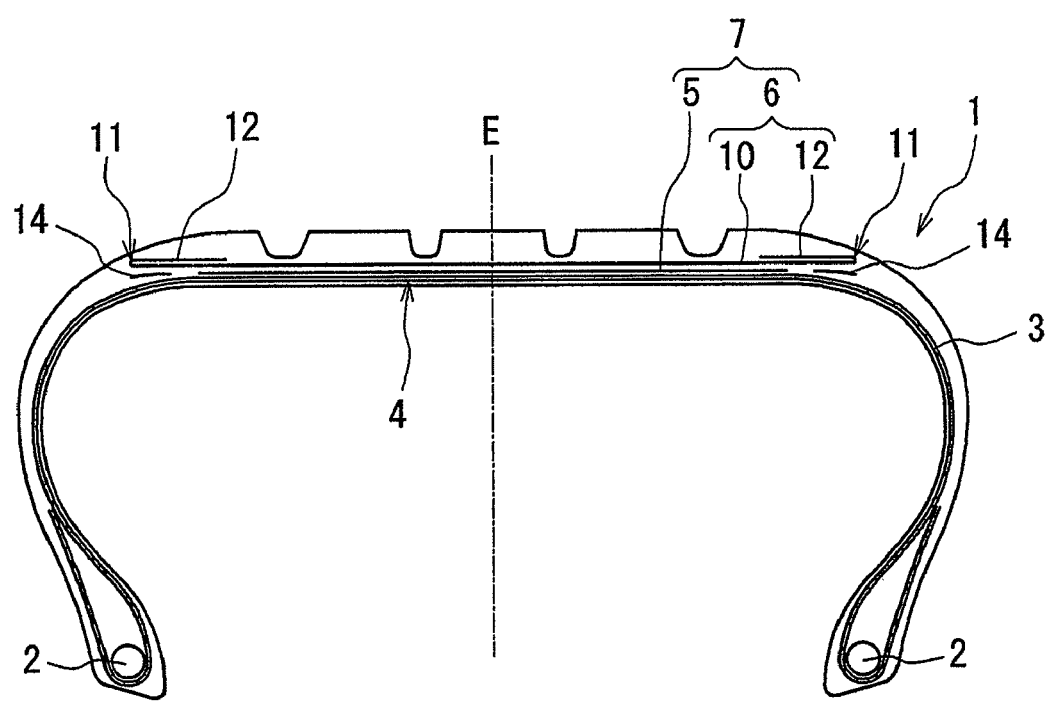
FIG. 1 is a widthwise sectional view of a representative pneumatic tire according to the present invention.
Figure 2:
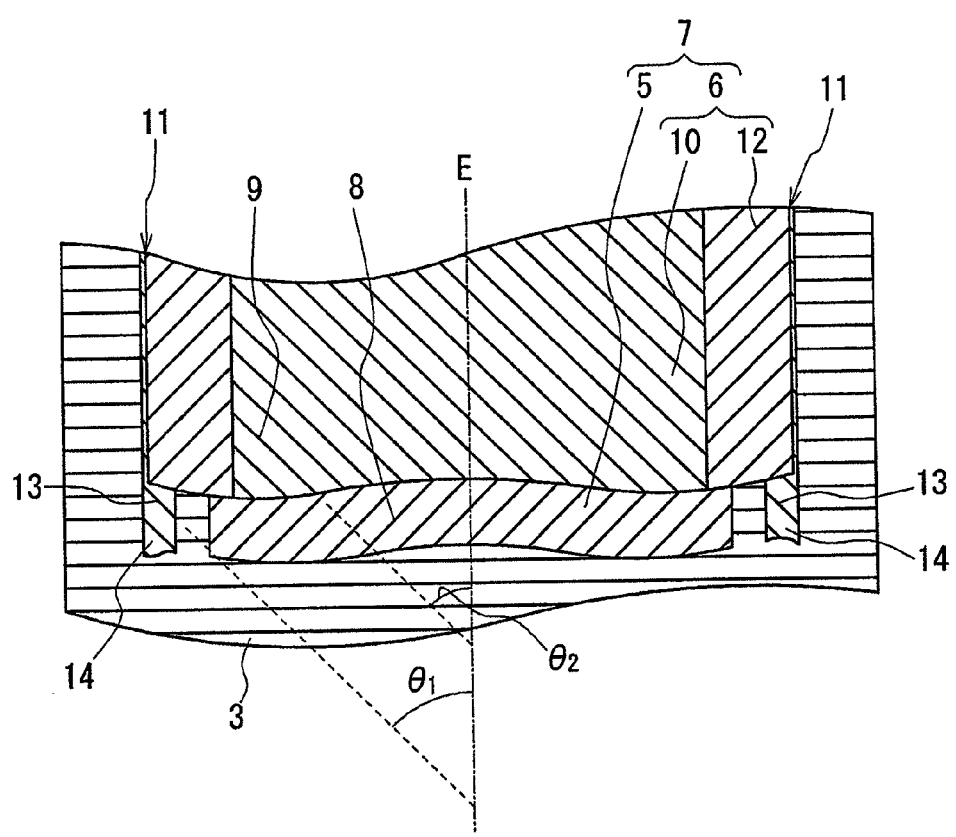
FIG. 2 shows one embodiment of an arrangement of the cords of the belt and the belt reinforcing layer of the tire shown in FIG. 1.
Figure 3:
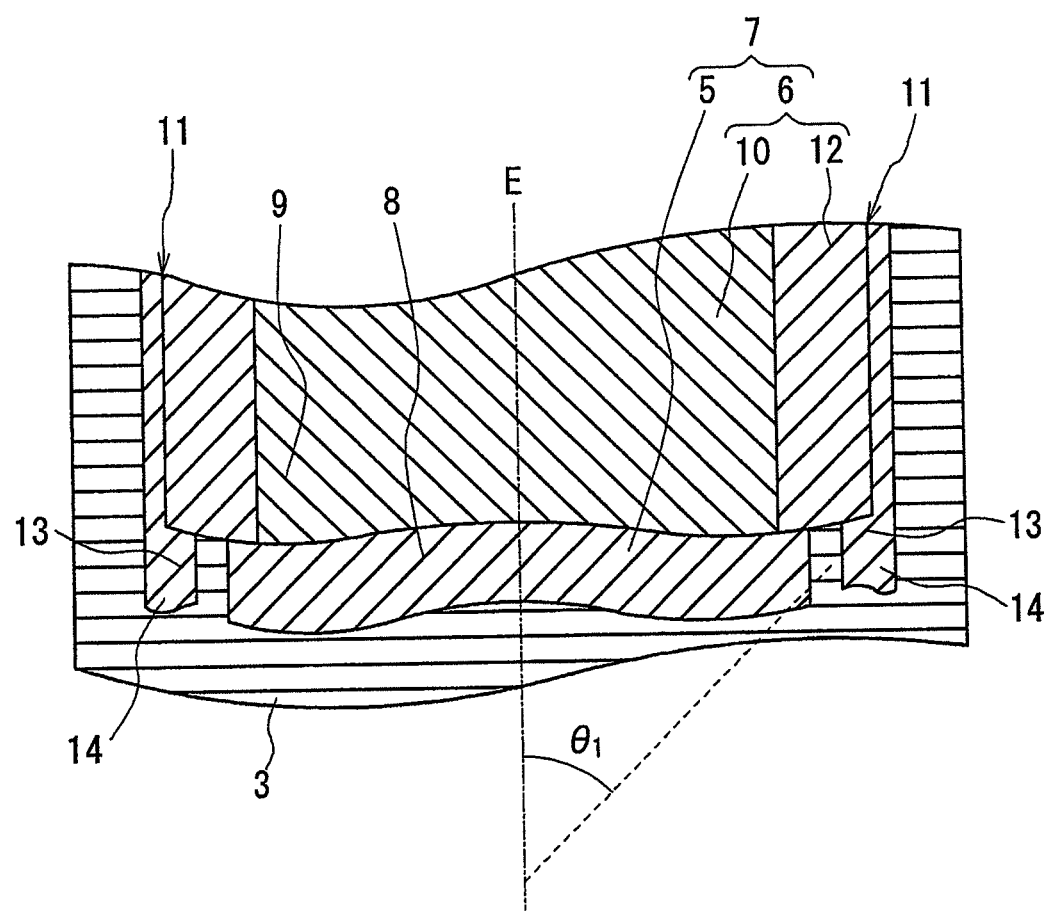
FIG. 3 shows another embodiment of an arrangement of the cords of the belt and the belt reinforcing layer of the tire shown in FIG. 1.

In the next, embodiments of the present invention are discussed with reference to the drawings. FIG. 1 is a sectional view of a representative pneumatic tire (hereinafter referred to as "tire") according to the present invention in the width direction of the tire. FIG. 2 shows an arrangement of the cords of the belt and the belt reinforcing layer of the first embodiment of the tire of the present invention. FIG. 3 shows an arrangement of the cords of the belt and the belt reinforcing layer of the second embodiment of the tire of the present invention.

The tire 1 shown in FIG. 1 has a carcass 3 consisting of at least one carcass ply (in FIG. 1, one carcass ply 3) toroidally extending between a pair of bead cores 2, 2 and a belt 7 consisting of at least two belt layers (in FIG. 1, two belt layers 5, 6) containing rubberized cords and arranged in the outer circumferential side of a crown portion 4 of the carcass 3. Between the adjacent belt layers 5 and 6, cords 8, 9 are crossed with each other with respect to an equatorial plane E of the tire to form cross belt layers, as shown in FIG. 2.

Then, a main structural feature of the present invention is that the widest belt layer 6 among the belt layers constituting the belt 7 is a folded belt layer having a body portion 10 which forms the cross belt layers with another adjacent belt layer 5 and a folded portions 12, 12 which extend from at least one width terminal end (in FIG. 1, both terminal ends 11, 11) of the body portion 10 and is formed by folding back on the outer circumferential side of the body portion 10, and that a cord 9 constituting the folded belt layer 6 is an organic fiber cord, and that narrow belt reinforcing layers 14, 14 of rubberized cords are arranged at least immediately below the width terminal end (in FIG. 1, both terminal ends 11, 11) of the body portion 10 of the folded belt layer 6 which terminal ends 11, 11 abut on the folded portions 12, 12.

As discussed above, although the tire having a folded belt layer can suppress a slide in the circumferential direction at the both width terminal end of the tire and can thus effectively prevent the occurrence of the cracks due to the shear of the rubber between the belt layers, when an organic fiber cord is used for the cord constituting the folded belt layer, there is a problem that another crack is likely to occur due to the raveling of the organic fiber. Experience shows that such a crack tends to occur at the body portion rather than the folded portion. In order to prevent the occurrence of such a crack, it is necessary to ease the compression of the cord at the both width terminal end of the folded belt layer. To this end, the present invention arranges the belt reinforcing layers 14, 14 immediately below the width terminal ends 11, 11 of the body portion 10 of the folded belt layer 6 to, thereby, disperse or reduce the compression force applied to the cord 9 of the body portion 10 of the belt layer 6 by means of the belt reinforcing layer 14, 14. As a result, the crack due to the raveling of the organic fiber can be effectively prevented to improve the durability.

The reason why the end portion of the widest belt layer is folded is that the wider the belt layer is, the more the crack tends to occur at the end portion of the belt. That is, the folded belt layer is less likely to occur a crack at the end portion than the non-folded belt layer, so that it is effective for preventing the crack to form the widest belt layer as a folded belt layer. In the course of a design of the tire, another belt layer may be arranged outside of the folded belt layer in the radial direction of the tire, or another belt layer may be arranged inside of the folded belt layer in the radial direction of the tire, or another belt layers may be arranged inside and outside of the folded belt layer in the radial direction of the tire if the belt has three or more belt layers.

As an organic fiber constituting the cord 9 of the folded belt layer, aromatic polyamide, nylon, grass fiber or the like may be used, and aromatic polyamide, which has high strength and less stretchable characteristic even at a high temperature, is especially preferred since the rigidity of the belt can be maintained and the driveablity can thus be improved during the high speed running where the tire is at high temperature. The cord 8 constituting another belt layer 5 is not particularly limited and either a steel cord or an organic fiber cord can be used.

Further, experience shows that the cord of the tire having a conventional folded belt layer tends to ravel at the region between 5 mm and 10 mm inwardly in the width direction of the tire from the width terminal end. Hence, when the belt reinforcing layer is arranged to cover the region between 5 mm and 10 mm inwardly of the tire from the width terminal end, the compressive strain can be reduced at the region in which the cord tends to easily ravel to, thereby, further effectively improve the durability. More specifically, the belt reinforcing layer 14 is preferably arranged over a region at least between 10 mm and 100 mm inwardly in the width direction of the tire from the position immediately below the width terminal ends 11, 11 of the body portion 10 of the folded belt layer 6. When this arranging region is less than 10 mm, the effect of reducing the compressive strain by the belt reinforcing layer 14 may not be effectively exerted. On the other hand, when this arranging region is more than 100 mm, the left and right belt reinforcing layers 14, 14 may be overlapped in the case of a small tire or the belt reinforcing layer 14 may have an effect of reinforcing the tread portion similar to the belt 7 and thus the rigidity of the tread portion becomes too high to be bent. As a result, the area of tread portion grounding the road surface is reduced and there is concern that the driveability is diminished.

In the first embodiment of the tire shown in FIG. 2, the cord 13 constituting the belt reinforcing layer 14 and the cord 9 of the body portion 10 of the folded belt layer 6 are so arranged that they incline in the same direction with respect to the equatorial plane E of the tire. Thus, the compressive force applied to the width terminal end of the belt is supported by the cord 13 of the belt reinforcing layer 14 and cord 9 of the body portion 10 of the belt layer 6 in a dispersed manner, so that the compressive force applied to the cord 9 of the body portion 10 of the folded belt layer 6 is greatly reduced. As a result, the occurrence of the crack due to the ravel of the organic fiber can be effectively prevented to, thereby, improve the durability.

The part of the cord laid at the region between 5 mm and 10 mm inwardly from the width terminal end 11 of the body portion 10 of the folded belt layer 6 is most likely to be raveled, and the compressive force act on this part has components in both the width and circumferential directions of the tire. Consequently, in order for the first embodiment of the tire to allow the belt reinforcing layer to effectively bear the compressive force, the cord 13 constituting the belt reinforcing layer 14 is preferably arranged on the angle with respect to the equatorial plane E of the tire to be able to support both of the width and circumferential component of the compressive force. The cord 13 is more preferably arranged at the angle with respect to the equatorial plane E within a range +1-10 degrees from the angle $\theta_2$ formed between the cord 9 constituting the body portion 10 of the folded belt layer 6 and the equatorial plane E of the tire. Specifically, since the angle $\theta_2$ is typically set to 20 to 50 degrees, the angle $\theta_1$ is preferably 10 to 60 degrees. When the angle $\theta_1$ is less than 10 degrees, the effect of supporting the width component of the compressive force is insufficient. On the other hand, when the angle $\theta_1$ is more than 60 degrees, the effect of supporting the circumferential component of the compressive force is insufficient. In either cases, the occurrence of the crack is concerned.

Further, in the first embodiment of the tire, it is preferred that the angle $\theta_1$ formed between the cord 13 constituting the belt reinforcing layer 14 and the equatorial plane E of the tire is generally the same as the angle $\theta_2$ formed between the cord 9 constituting the body portion 10 of the folded belt layer 6 and the equatorial plane E of the tire. In this way, when the angles $\theta_1$ and $\theta_2$ are set to be generally the same with each other, the compressive force borne by the cord 13 constituting the belt reinforcing layer 14 is largest and the compressive force borne by the cord 9 constituting the body portion 10 of the folded belt layer 6 is smallest so that the effect of preventing the ravel of the cord 9 is maximized.

On the other hand, in the second embodiment of the tire shown in FIG. 3, the cord 13 of the belt reinforcing layer 14 and the cord 9 of the body portion 10 of the folded belt layer 6 are arranged to be intersected one another with the equatorial plane E of the tire being therebetween, so that the belt reinforcing layer 14 and the width terminal end 11 of the body portion 10 of the folded belt 6 restrict with each other to allow the cords constituting these layers to be difficult to move especially in the circumferential direction of the tire. This significantly reduces the compressive strain of the cord occurred at the width terminal end 11 and, as a result, effectively prevents the crack due to the ravel of the organic fiber to, thereby, improve the durability as well.

Moreover, in the second embodiment of the tire, the angle $\theta_1$ formed between the cord 13 constituting the belt reinforcing layer 14 and the equatorial plane E of the tire is preferably within a range from 20 to 70 degrees. When the angle $\theta_1$ is less than 20 degrees, the restricting effect in the circumferential direction of the tire is reduced and consequently the cord 9 adjacent to both of the width terminal ends 11, 11 of the body portion 10 of the folded belt layer 6 tends to slide in the circumferential direction of the tire. On the other hand, when the angle $\theta_2$ is more than 70 degrees, the restricting effect in the width direction of the tire is reduced and consequently the cord 9 adjacent to both of the width terminal ends 11, 11 of the body portion 10 of the folded belt layer 6 tends to slide in the width direction of the tire. In either case, the occurrence of the crack is concerned.

Figure 4:
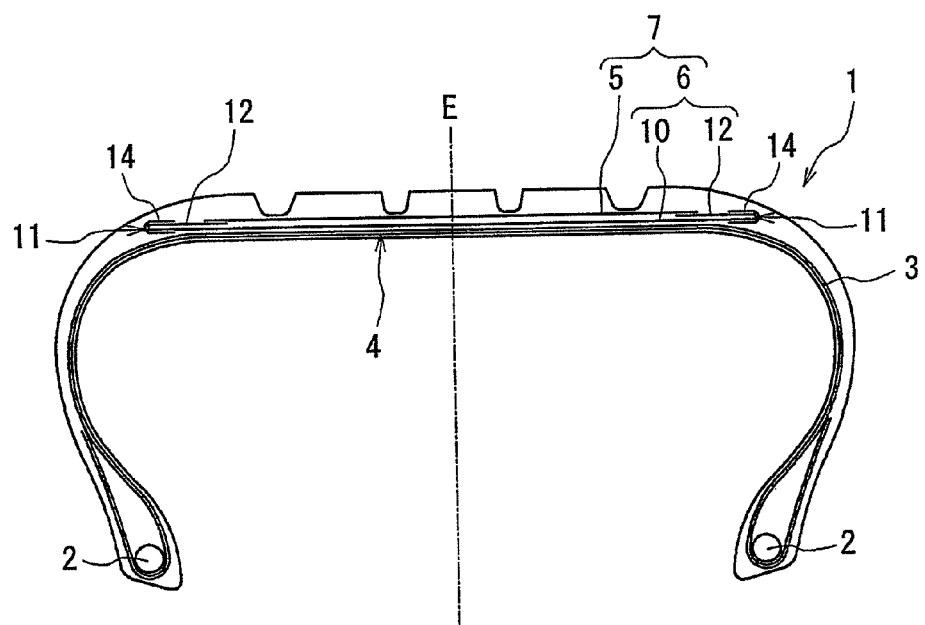
FIG. 4 is a widthwise sectional view of another pneumatic tire according to the present invention.
Figure 5:
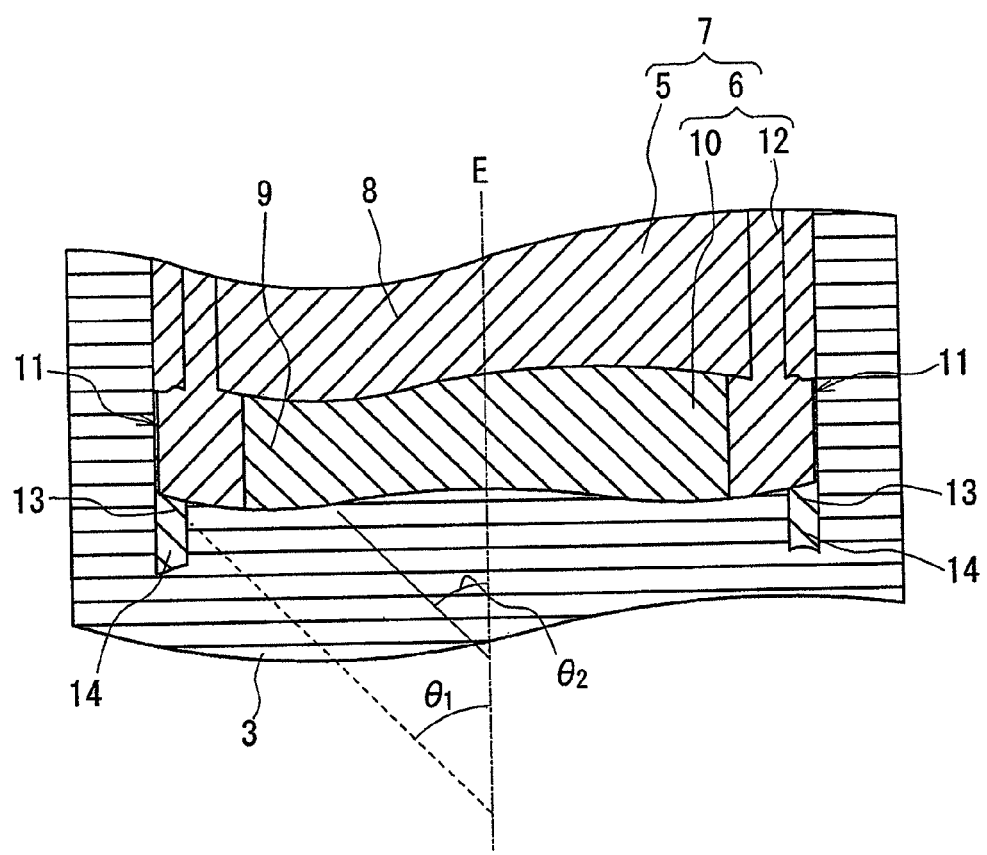
FIG. 5 shows one embodiment of an arrangement of the cords of the belt and the belt reinforcing layer of the tire shown in FIG. 4.
Figure 6:
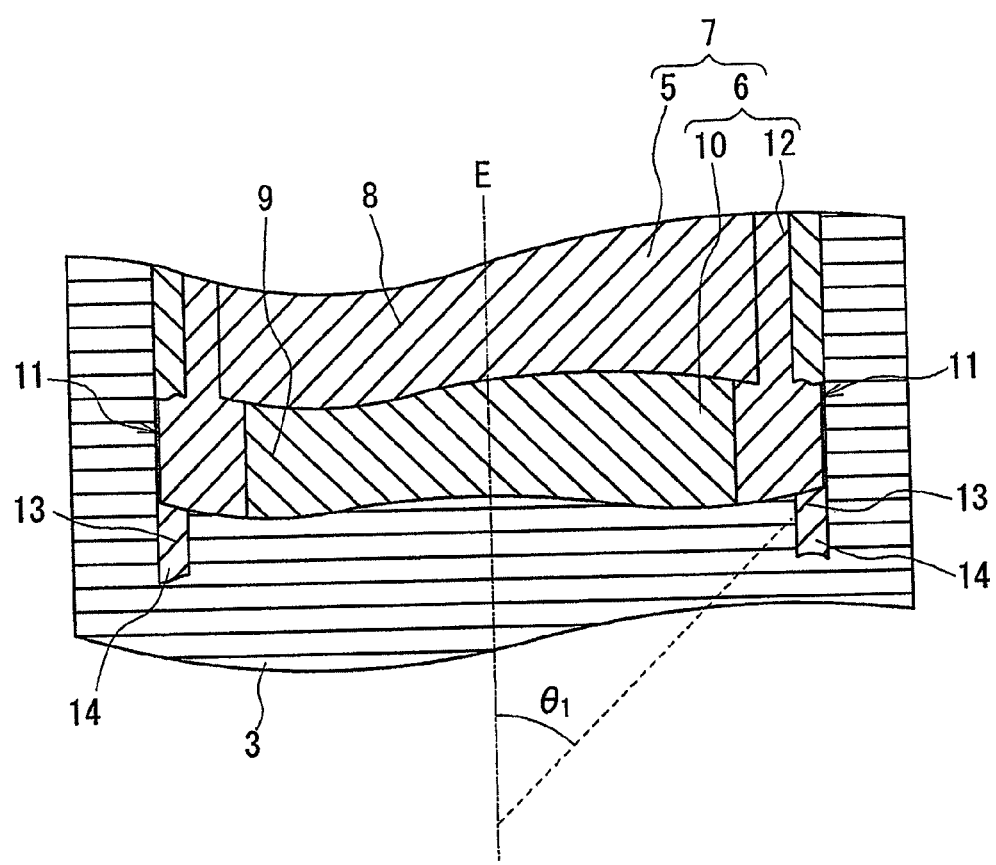
FIG. 6 shows another embodiment of an arrangement of the cords of the belt and the belt reinforcing layer of the tire shown in FIG. 4.

Either in the case where the cord 13 constituting the belt reinforcing layer 14 and the cord 9 of the body portion 10 of the folded belt layer 6 incline in the same direction with respect to the equatorial plane E of the tire or in the case where they mutually intersect with the equatorial plane E of the tire being therebetween, the belt reinforcing layer 14 is preferably folded back on the outer circumferential side of the body portion 10 of the folded belt layer 6 along with the folded belt layer 6, as shown in FIG. 4 and FIG. 5 or 6. In the first embodiment of the tire, the cord 13 has a free end near the width terminal end of the belt reinforcing layer 14, so that, when the compressive force is applied, it slides in such a direction that it escapes from the compressive force. As a result, the effect of dispersing the compressive force into the cord 13 constituting the belt reinforcing layer 14 and cord 9 constituting the body portion 10 of the folded belt layer 6 may not be sufficiently exerted. To the contrary, when the belt reinforcing layer 14 is folded, the cord 13 has no free end near the width terminal end of the belt reinforcing layer 14 and consequently the effect of dispersing the compressive force can be further enhanced. Further, in the second embodiment of the tire, the cord 9 near the width terminal end 11 of the folded belt layer 6 and the cord 13 of the belt reinforcing layer 14 are certainly in the crossing arrangement by folding back the belt reinforcing layer 14, so that the width terminal end 11 of the folded belt layer 6 is more strongly restricted. As a result, the compression of the cord 9 can be further suppressed to still assure the prevention of the crack. In addition, the cut edge of the cord 13 of the belt reinforcing layer 14 is located inside of the maximum width position of the belt 7 in the width direction of the tire, so that the crack from the cut edge of the cord 13 of the belt reinforcing layer 14 can be prevented.

FIGS. 1-3 show an embodiment in which another belt layer 5 is arranged inside of the folded portion 12 of the folded belt layer 6 in the radial direction of the tire, and FIGS. 4-6 show an embodiment in which another belt layer 5 is arranged outside of the folded portion 12 of the folded belt layer 6 in the radial direction of the tire. The folded belt layer 6 may also be arranged to envelop the width terminal ends 15, 15 of the another belt layer 5 with the body portion 10 and the folded portion 12, as shown in FIGS. 7-12. This embodiment is preferred in the point that the width terminal ends 15, 15 of the another belt layer 5 are covered by the folded portion 12 of the folded belt layer 6 to be able to prevent the crack from the width terminal ends 15, 15 of the another belt layer 5.

In addition, the cord 13 constituting the belt reinforcing layer 14 is preferably any one of an organic fiber cord, glass fiber cord and steel cord depending on the mass, rigidity and the like required for the belt reinforcing layer. The organic fiber cord has an advantage that the cord itself is flexible which, in turn, leads to less increase in the rigidity at both of the end portions of the tread portion due to the belt reinforcing layer 14, so that there is no possibility of deteriorate the grounding characteristics and the driveability. Aromatic polyamide and nylon, for example, may be used as organic fiber. A grass fiber cord has an advantage that it has high compressive resistance while being lightweight. A steel cord has a disadvantage in weight, but it has the highest compressive resistance and is, therefore, the most superior material in terms of improving the durability.

The descriptions above show only a part of the preferred embodiments of the present invention, and various modifications can be made within the scope of the appended claims. For example, the shown embodiments have a belt consisting of two belt layers, but the belt may have three or more belt layers. In the latter case, the folded belt layer may be configured to envelope all of the other belt layers, or the folded belt layer may envelope a part of the other belt layers and the rest of the belt layers may be arranged inside and/or outside of the folded belt layer in the radial direction of the tire. Further, a so-called cap layer which prevents a radial growing of the belt may be provided on the outer circumferential side of the belt. Moreover, in the shown embodiments, the belt reinforcing layer is arranged at the positions corresponding to both of the width terminal end of the folded belt layer, but it may be arranged at the position corresponding to only one width terminal end.

EXAMPLES

Pneumatic tires according to the present invention are experimentally manufactured and evaluated their performances. The details will be described below.

Figure 7:
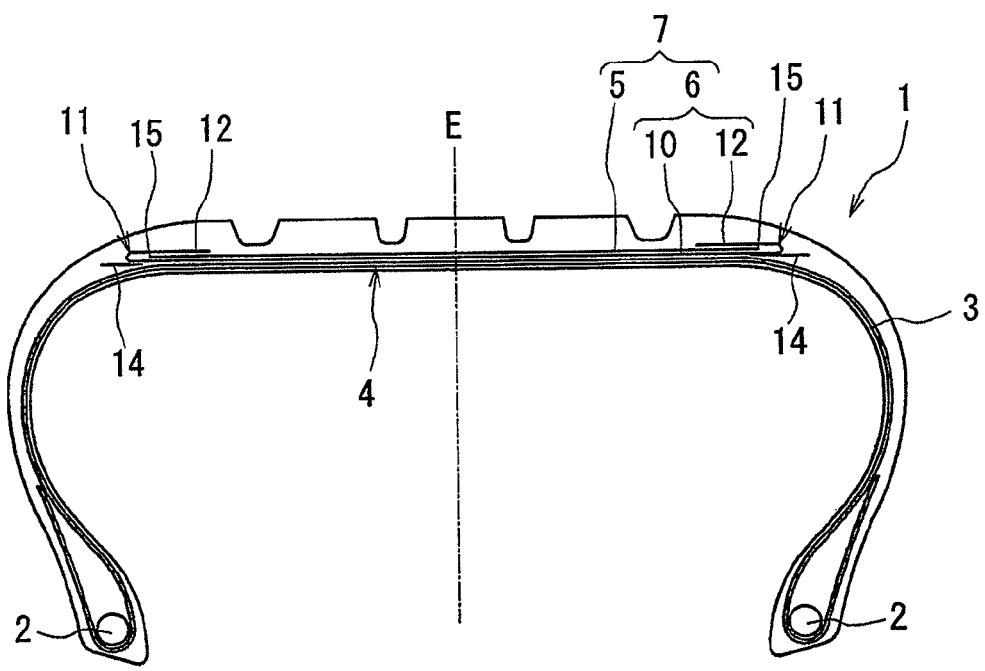
FIG. 7 is a widthwise sectional view of another pneumatic tire according to the present invention.
Figure 8:
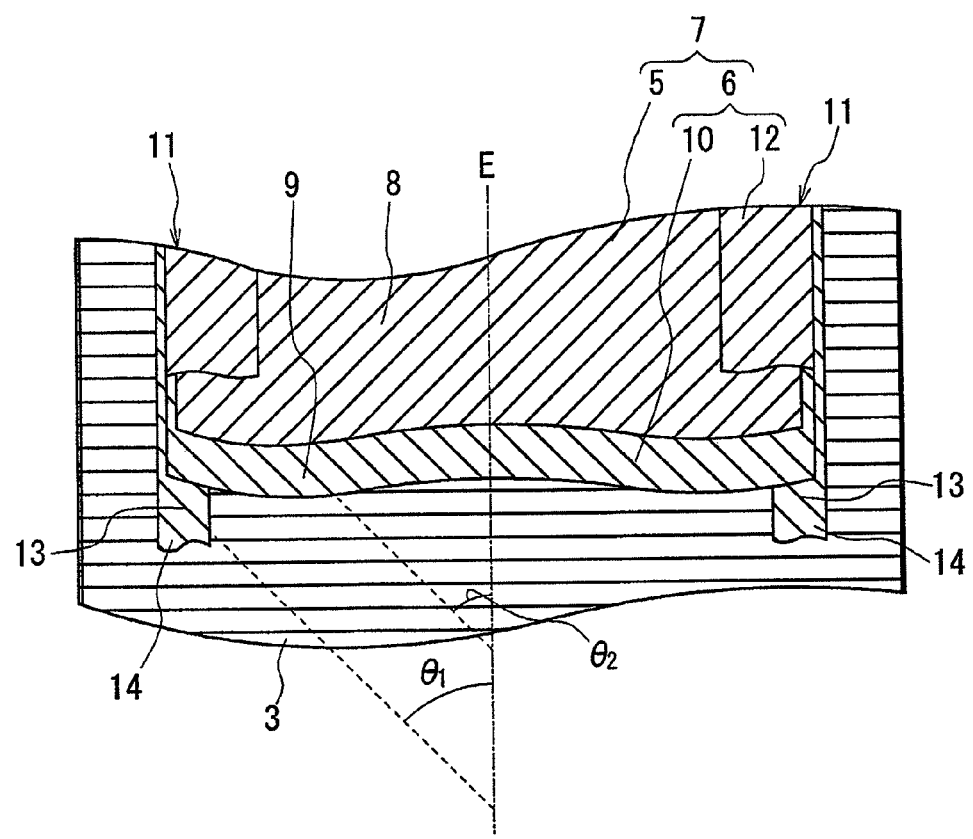
FIG. 8 shows one embodiment of an arrangement of the cords of the belt and the belt reinforcing layer of the tire shown in FIG. 7.
Figure 9:
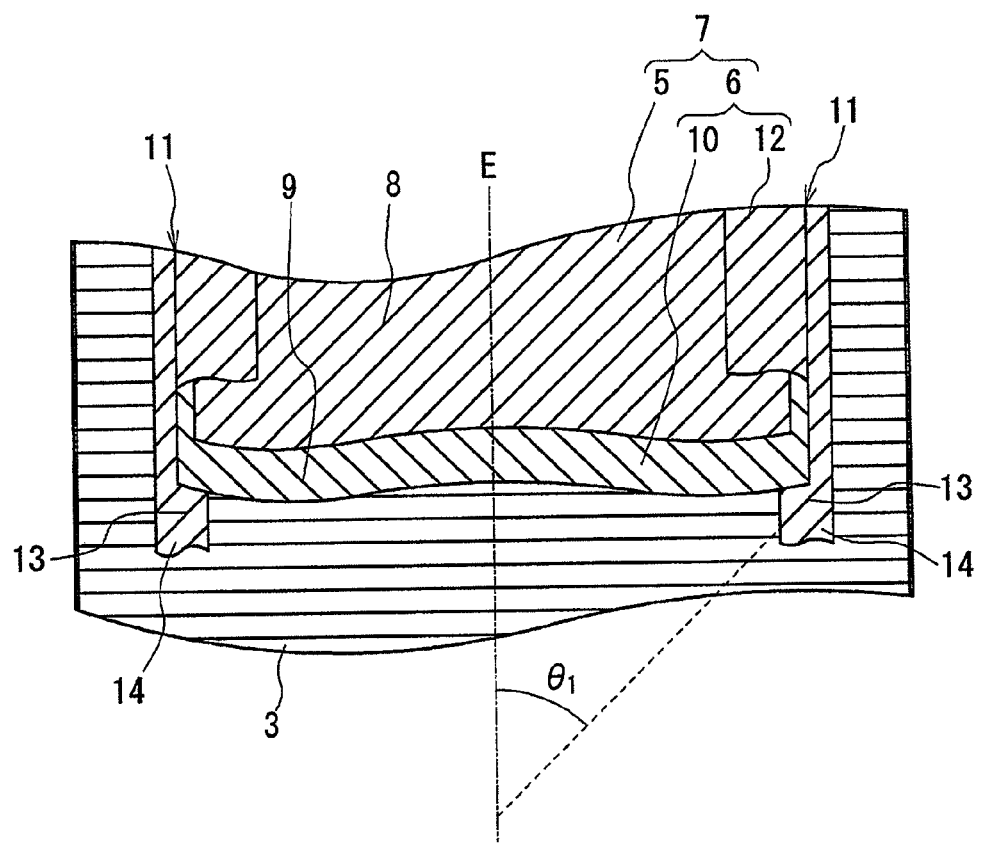
FIG. 9 shows another embodiment of an arrangement of the cords of the belt and the belt reinforcing layer of the tire shown in FIG. 7.
Figure 10:
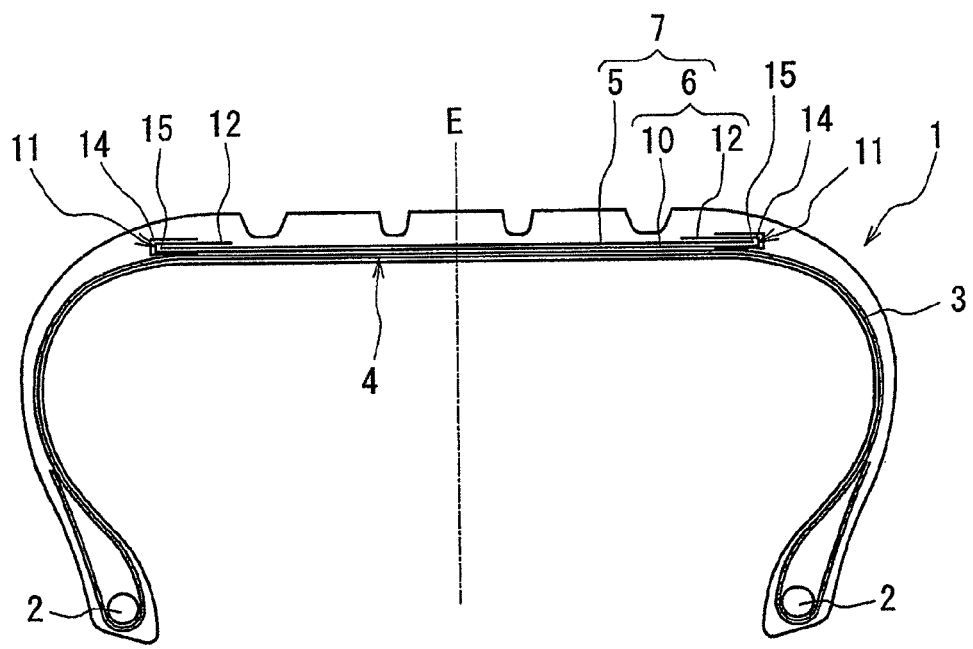
FIG. 10 is a widthwise sectional view of another pneumatic tire according to the present invention.
Figure 11:
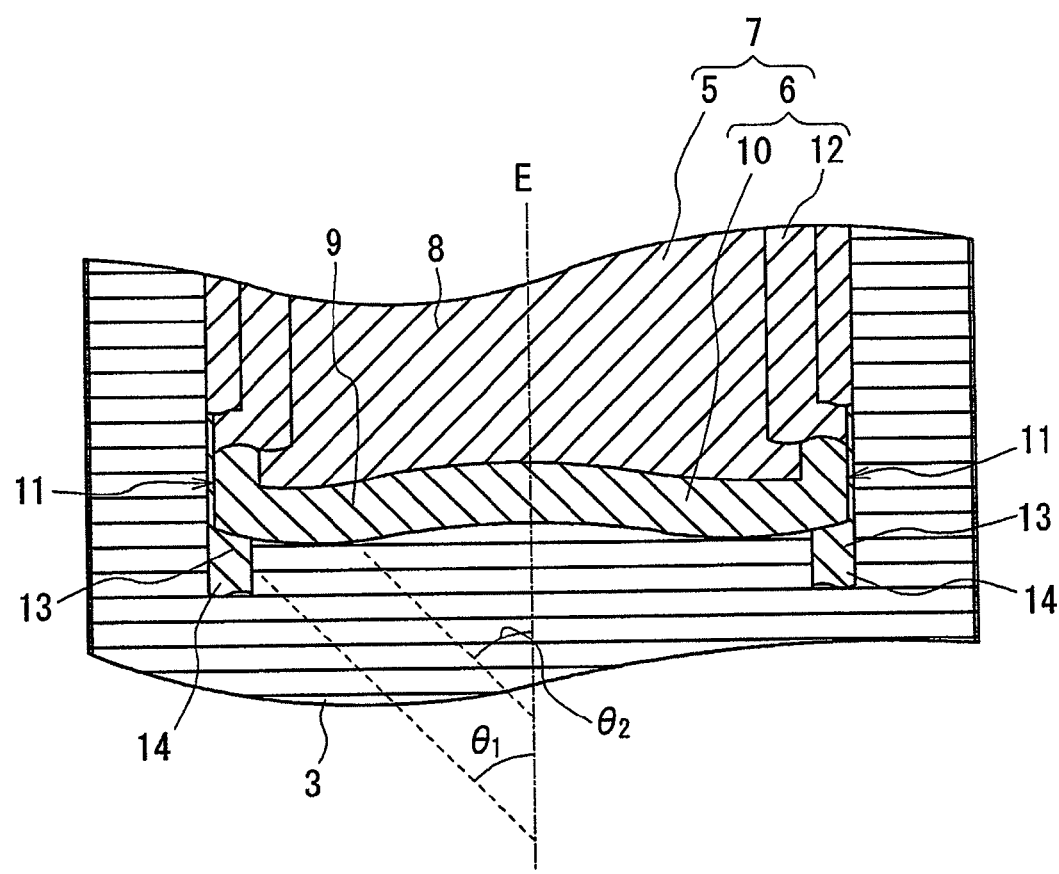
FIG. 11 shows one embodiment of an arrangement of the cords of the belt and the belt reinforcing layer of the tire shown in FIG. 10.
Figure 12:
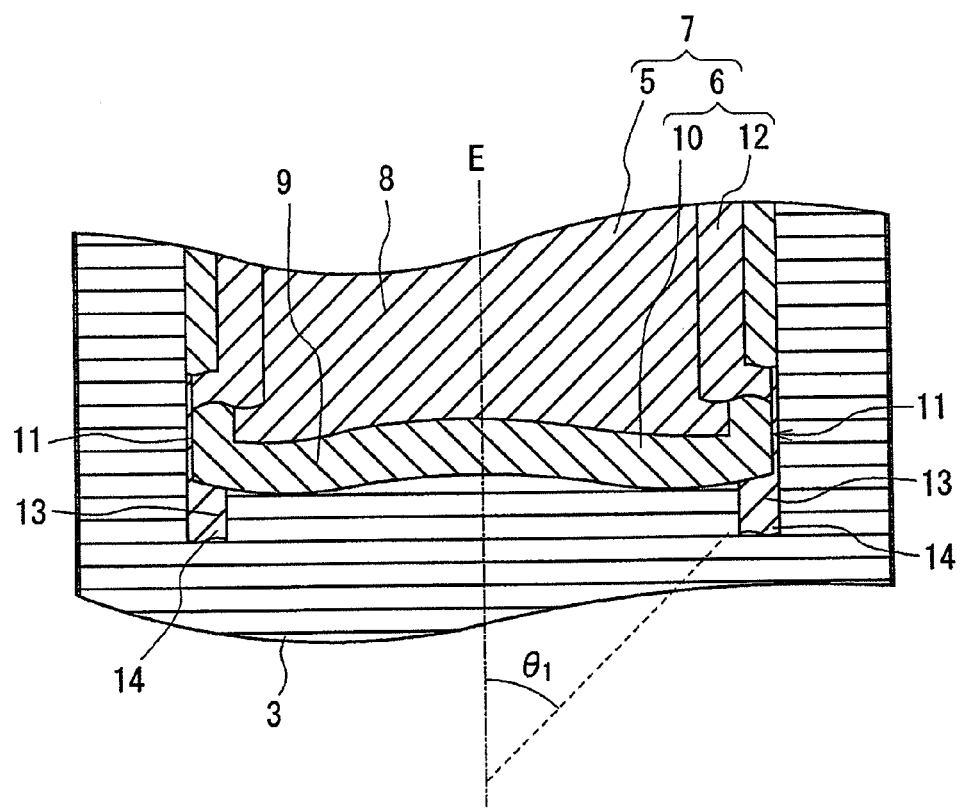
FIG. 12 shows another embodiment of an arrangement of the cords of the belt and the belt reinforcing layer of the tire shown in FIG. 10.

Tires of Examples 1-7 are radial tire for a passenger vehicle having a tire size of 225/50R16. The tires also have a carcass consisting of two plies containing rubberized nylon cords extending at 90 degrees with respect to the equatorial plane of the tire; a belt (width: 210 mm) consisting of two belt layers one of which is a belt layer containing rubberized aramid fiber cords (which are twisted cords with the diameter of 0.9 mm, and arranged at intervals of 1.5 mm) extending at 30 degrees with respect to the equatorial plane of the tire, and the other of which is a belt layer containing rubberized steel cords (which are twisted cords of three steel filament with the wire diameter of 0.28 mm, and arranged at intervals of 1.2 mm) extending in the direction intersecting the cords constituting the other belt layer with the equatorial plane of the tire being therebetween at 30 degrees with respect to the equatorial plane of the tire; and a pair of belt reinforcing layers (width: 20 mm). Among the two belt layers, the belt layer containing rubberized aramid fiber cord is wider and is a folded belt layer provided at the both ends with a pair of folded portions having the width of 25 mm. In the tire of Example 1, the width terminal ends of the other belt layer are spaced inward from the width terminal ends of the body portion of the folded belt layer by 25 mm in the width direction of the tire, and the pair of the belt reinforcing layers are arranged over regions between the positions immediately below the both width terminal ends of the body portion of the folded belt layer and the positions at 20 mm inward from the terminal ends in the width direction of the tire, as shown in FIGS. 1 and 2. The tire of Example 1 also has the specifications shown in Table 1. In the tires of Examples 2-6, the pair of the belt reinforcing layers are arranged over regions between the positions immediately below the both width terminal ends of the body portion of the folded belt layer and the positions at 20 mm inward from the terminal ends in the width direction of the tire, and the body portion of the folded belt, the other belt layer and the belt reinforcing layer are arranged to generally align their width terminal ends, as shown in FIGS. 7 and 8. The tires of Examples 2-6 also have the specifications shown in Table 1. In the tire of Example 7, the pair of the belt reinforcing layers are so folded back with the folded belt layer that the widths of the folded portion located inside and outside in the radial direction of the tire are 20 mm and 15 mm, respectively, resulting in the width of the outside folded portion of the belt reinforcing layer being 60% of the width of the respective folded portion of the folded belt layer (15 mm/25 mm=60%), and the body portion of the folded belt, the other belt layer and the belt reinforcing layer are arranged to generally align their width terminal ends, as shown in FIGS. 10 and 11. The tire of Example 7 also has the specifications shown in Table 1.

Tires of Examples 8-14 are radial tire for a passenger vehicle having a tire size of 225/50R16. The tires also have a carcass consisting of two plies containing rubberized nylon cords extending at 90 degrees with respect to the equatorial plane of the tire, and a belt (width: 210 mm) consisting of two belt layers which contain rubberized aramid fiber cords (which are twisted cords with the diameter of 0.9 mm, and arranged at intervals of 1.5 mm) extending at 30 degrees with respect to the equatorial plane of the tire and are arranged to be cross belt layers. Among the two belt layers, the wider belt layer is a folded belt layer provided at the both ends with a pair of folded portions having the width of 25 mm, and the body portion and the folded portions of the folded belt layer envelop the width terminal ends of the other belt layer. The tires of Examples 8-11 are provided with a pair of belt reinforcing layers which have the widths of 20 mm each of inside and outside of the position immediately below both of the width terminal end of the body portion of the folded belt layer in the width direction of the tire, i.e. 40 mm in total, and which contains rubberized cords extending in the direction intersecting the cords of the body portion of the folded belt layer with the equatorial plane of the tire being therebetween. The tires of Examples 8-11 also have the configuration shown in FIGS. 7 and 9 and the specifications shown in Table 2. The tires of Examples 12-14 are provided with a pair of belt reinforcing layers which extend 20 mm and 10 mm, respectively, from the position immediately below the both width terminal ends of the body portion of the folded belt layer and from the position immediately above the width terminal ends of the folded portions of the folded belt layer, resulting in the width of the outside folded portion of the belt reinforcing layer being 40% of the width of the respective folded portion of the folded belt layer (10 mm/25 mm=40%). The tires of Examples 12-14 also have the configuration shown in FIGS. 10 and 12 and the specifications shown in Table 2.

It is noted that the extending angles of the cords inevitably fluctuates in the process of manufacturing the belt reinforcing layer, so the actual belt reinforcing layers have fluctuations in the extending angles about +/−5 degrees from those shown in Table 1. It is also noted that the term "arranging interval" as used herein means the distance between the centers of cords in the coating rubber layer of the cord, and, for example, the arranging interval of 1.5 mm refers to the arrangement in which 100 cords are laid in the width of 150 mm.

Figure 13:
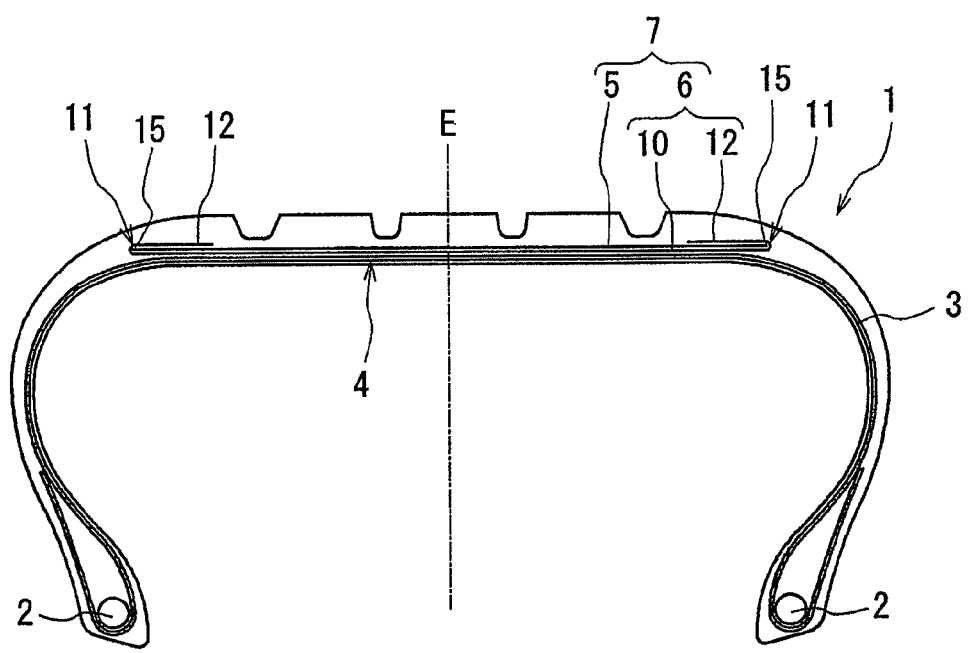
FIG. 13 is a widthwise sectional view of a pneumatic tire of Conventional Example 1.
Figure 14:
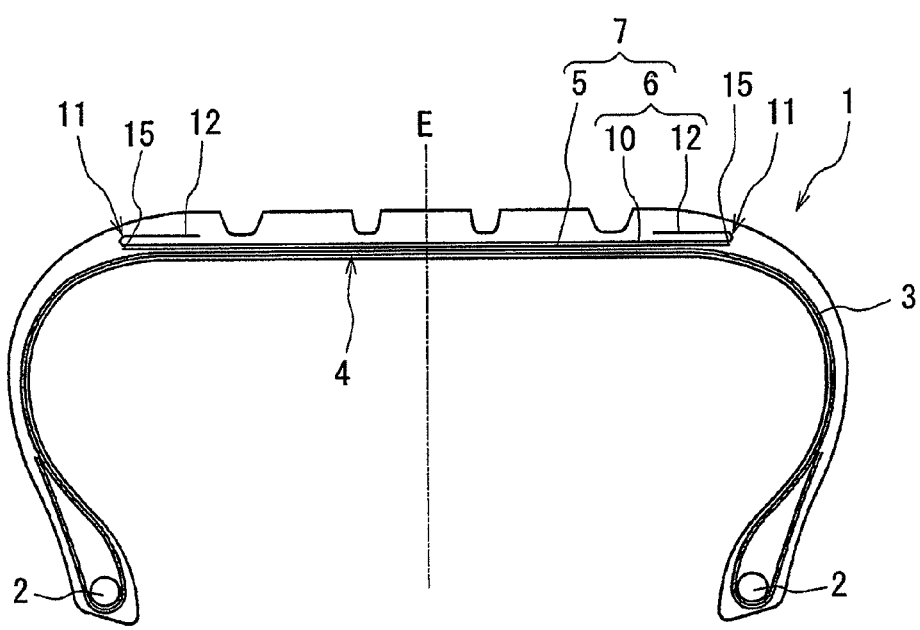
FIG. 14 is a widthwise sectional view of a pneumatic tire of Conventional Example 2.

For the purpose of comparison, experimentally manufactured are tires of Conventional Examples 1 and 2 which have the configurations as shown in FIGS. 13 and 14, respectively, and also have the same tire size, carcass and belt layer as those of Examples 1-7 no belt reinforcing layer. The tires of Conventional Examples 1 and 2 also have the specifications shown in Table 1. Also, a tire of Conventional Example 3 which has the same tire size, carcass and belt layer as those of Examples 8-14 but does not have a belt reinforcing layer are experimentally manufactured. The tire of Conventional Example 3 also has the configuration shown in FIG. 3 and the specification shown in Table 2.

Each of the above-mentioned testing tires is mounted on a rim having the rim size of 7JJ to form a tire wheel. To the tire wheel, internal pressure of 130 kPa which is lower than the regulated internal pressure (220 kPa) is applied to initiate a failure of the belt at the early stage. The tire wheel, then, is subjected to running on a drum-testing machine with the diameter of 3 m for 50 hours under the condition of the tire load of 7 kN, slipping angle of 2 degrees and testing speed of 60 km/h. After the test run, each of the testing tires is disassembled and visually inspected any ravels of the cords of the folded belt and any cracks near the belt for the evaluation of the durability. The results are shown in Tables 1 and 2.

TABLE 1

| | Tire structure | Cord constituting the belt reinforcing layer | | | | Result |
| | | Material | Diameter | Arranging interval | Extending angle | |
| --- | --- | --- | --- | --- | --- | --- |
| Conv. Example 1 | FIG. 13 | — | — | — | — | 2 |
| Conv. Example 2 | FIG. 14 | — | — | — | — | 2 |
| Example 1 | FIGS. 1, 2 | aramid | 0.9 mm | 1.5 mm | 20 deg. | 1 |
| Example 2 | FIGS. 7, 8 | aramid | 0.9 mm | 1.5 mm | 30 deg. | 1 |
| Example 3 | FIGS. 7, 8 | aramid | 0.9 mm | 1.5 mm | 50 deg. | 1 |
| Example 4 | FIGS. 7, 8 | steel | 0.17 mm 3 twisted cords | 1.5 mm | 30 deg. | 0 |

TABLE 1-continued

| | | Cord constituting the belt reinforcing layer | | | | |
|---|---|---|---|---|---|---|
| | Tire structure | Material | Diameter | Arranging interval | Extending angle | Result |
| Example 5 | FIGS. 7, 8 | steel | 0.28 mm single wire | 1.5 mm | 30 deg. | 0 |
| Example 6 | FIGS. 7, 8 | glass fiber | 0.9 mm | 1.5 mm | 30 deg. | 0 |
| Example 7 | FIGS. 10, 11 | aramid | 0.9 mm | 1.5 mm | 30 deg. | 1 |

TABLE 2

| | | Cord constituting the belt reinforcing layer | | | | |
|---|---|---|---|---|---|---|
| | Tire structure | Material | Diameter | Arranging interval | Extending angle | Result |
| Conv. Example 3 | FIG. 13 | — | — | — | — | 2 |
| Example 8 | FIGS. 7, 9 | aramid | 0.9 mm | 1.5 mm | 30 deg. | 0 |
| Example 9 | FIGS. 7, 9 | aramid | 0.9 mm | 1.5 mm | 45 deg. | 0 |
| Example 10 | FIGS. 7, 9 | aramid | 0.9 mm | 1.5 mm | 60 deg. | 1 |
| Example 11 | FIGS. 7, 9 | nylon | 0.6 mm | 1.5 mm | 45 deg. | 0 |
| Example 12 | FIGS. 10, 12 | aramid | 0.9 mm | 1.5 mm | 30 deg. | 0 |
| Example 13 | FIGS. 10, 12 | aramid | 0.9 mm | 1.5 mm | 45 deg. | 0 |
| Example 14 | FIGS. 10, 12 | aramid | 0.9 mm | 1.5 mm | 60 deg. | 1 |

In Tables 1 and 2, the term "extending angle" means the angle formed between the cord and the equatorial plane of the tire. The result of the ravel of the cord is evaluated with 0 being as a case where any ravels or peelings of the rubber is not observed, 1 being as a case where slight ravel is observed the rubber firmly adheres to and is not peeled off from the cord, and 2 being as a case where the cord gets into ravel and the rubber is peeled off from the surface of the cord and the crack occurs. Note that in Examples 7 and 12-14 in Tables 1 and 2 the width of the outside folded portion of the belt reinforcing layer is 40%-60% of the width of the respective folded portion of the folded belt layer.

From the results shown in Table 1, it is appreciated that the tires of Examples 1-7 make a great improvement in the ravel of the cord and thus have better durability, as compared with the tires of Conventional Examples 1 and 2. It is noted that the cracks occurred in the tires of Conventional Examples 1 and 2 have the length of about 1 mm.

With the comparison between the tires of Examples 2 and 3, it is appreciated that, when the difference between the extending angles of the cord constituting the belt reinforcing layer and the cord constituting the body portion of the folded belt is less than 20 degrees, the durability of the tire is sufficiently improved no matter how large the difference is. With the comparison between the tires of Examples 2, 4 and 6, it is appreciated that Examples 4 and 6 which use steel cord and glass fiber cord, which have superior compression resistance, as the cord constituting the belt reinforcing layer are more durable than the tire of Example 2 which uses aramid fiber. With the comparison between the tires of Examples 2 and 7, it is appreciated that Example 7 in which the belt reinforcing layer is folded is more effective in preventing the crack at the terminal end of the belt reinforcing layer while maintaining the effect of preventing the ravel of the cord at the same level than Example 2 in which the belt reinforcing layer is not folded. With the comparison between Example 2 and Examples 4 and 5, it is appreciated that the cord using the steel with smaller diameter yield superior effects of preventing the ravel of the cord and the crack at the terminal end of the belt reinforcing layer.

From the results shown in Table 2, it is appreciated that the tires of Examples 8-14 make a great improvement in the ravel of the cord and thus have better durability, as compared with the tires of Conventional Example 3. It is noted that the crack occurred in the tires of Conventional Example 3 has the length of about 1 mm.

With the comparison between the tires of Examples 8-10, it is appreciated that, when the difference between the extending angles of the cord constituting the belt reinforcing layer and the cord constituting the body portion of the folded belt is less than 40 degrees, especially high effect of preventing the ravel is obtained. This is because the extending angle of the cord of the belt reinforcing layer in Example 10 is 60 degrees which is close to the radial direction, so that the effect of suppressing the movement in the circumferential direction of the tire is small. The effect of preventing the ravel of the cord, however, is apparently improved as compared to the tire of Conventional Example 3. With the comparison between the tires of Examples 9 and 11, the effect of preventing the ravel of the cord is almost the same, but Example 11 which uses nylon cord which has a smaller cord diameter and a better adhesiveness with the rubber has a better effect of preventing the crack at the terminal end of the belt reinforcing layer. With the comparisons between Examples 8 and 12, Examples 9 and 13 and Examples 10 and 14, Examples 12-14 in which the belt reinforcing layers are folded has generally the same effects of preventing the ravel of the cord and better effects of preventing the crack at the terminal end of the belt reinforcing layer.

INDUSTRIAL APPLICABILITY

According to the present invention, it is possible to provide a pneumatic tire in which the durability is improved, even when organic fiber cords are used for a folded belt layer, by dispersing or reducing the compress force applied to the organic fiber cord at the both end portions of the folded belt layer.

The invention claimed is:

1. A pneumatic tire having a carcass consisting of at least one toroidal carcass ply and a belt consisting of at least two belt layers containing rubberized cords and arranged in the outer circumferential side of a crown portion of the carcass, the cords of adjacent belt layers being crossed with each other with respect to an equatorial plane of the tire to form cross belt layers, wherein the widest belt layer among the belt layers constituting the belt is a folded belt layer having a body portion which forms the cross belt layers with another adjacent belt layer and a folded portion which extends from at least one width terminal end of the body portion and is formed by folding back on the outer circumferential side of the body portion, the cords of both the folded belt layer and the another adjacent belt layer forming an angle with the equatorial plane of the tire having the same value within a range from 20 to 50 degrees, and wherein a cord constituting the folded belt layer is an organic fiber cord, and wherein one narrow belt reinforcing layer of rubberized cords is arranged at least immediately below the width terminal end of the body portion of the folded belt layer which terminal end abuts on the folded portion, and wherein the belt reinforcing layer extends to a widthwise end located between 10 mm and 100 mm inwardly in the width direction of the tire from the position immediately below the width terminal end of the body portion of the folded belt layer, the cords of the belt reinforcing layer either inclining in the same direction as the cords in the body portion of the folded belt layer with respect to the equatorial plane of the tire and forming an angle with the equatorial plane of the tire within a range from 10 to 60 degrees or inclining in the opposite direction to the cords in the body portion of the folded belt layer with respect to the equatorial plane of the tire and forming an angle with the equatorial plane of the tire within a range from 20 to 70 degrees, wherein the another adjacent belt layer is arranged on the outer circumferential side of the folded belt layer and the folded belt layer envelops the width terminal ends of the another adjacent belt layer with its body portion and pair of folded portions, and wherein each belt reinforcing layer is folded back on the outer circumferential side of the folded belt layer along with the respective folded portion of the folded belt layer, the width of the outside folded portion of the belt reinforcing layer being 40%-60% of the width of the respective folded portion of the folded belt layer.

2. The pneumatic tire according to claim 1, wherein the the cords of the belt reinforcing layer incline in the same direction as the cords in the body portion of the folded belt layer with respect to the equatorial plane of the tire, and the angle formed between the cords of the belt reinforcing layer and the equatorial plane of the tire is within a range from 10 to 60 degrees.

3. The pneumatic tire according to claim 2, wherein the angle formed between the cords of the belt reinforcing layer and the equatorial plane of the tire is within a range ±20 degrees from the angle formed between the cords of the body portion of the folded belt layer and the equatorial plane of the tire.

4. The pneumatic tire according to claim 1, wherein the the cords of the belt reinforcing layer incline in the opposite direction to the cords in the body portion of the folded belt layer with respect to the equatorial plane of the tire, and the angle formed between the cords of the belt reinforcing layer and the equatorial plane of the tire is within a range from 20 to 70 degrees.

5. The pneumatic tire according to claim 1, wherein the cords of the belt reinforcing layer are organic fiber cords.

6. The pneumatic tire according to claim 1, wherein the cords of the belt reinforcing layer are glass fiber cords.

7. The pneumatic tire according to claim 1, wherein the cords of the belt reinforcing layer are steel cords.

* * * * *